(12) United States Patent
Aso et al.

(10) Patent No.: US 11,658,526 B2
(45) Date of Patent: May 23, 2023

(54) MOTOR, FAN, AIR CONDITIONING APPARATUS, AND METHOD FOR MANUFACTURING MOTOR

(71) Applicant: Mitsubishi Electric Corporation, Tokyo (JP)

(72) Inventors: Hiroki Aso, Tokyo (JP); Takaya Shimokawa, Tokyo (JP); Junichiro Oya, Tokyo (JP); Naoki Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 350 days.

(21) Appl. No.: 17/255,046

(22) PCT Filed: Aug. 2, 2018

(86) PCT No.: PCT/JP2018/029015
§ 371 (c)(1),
(2) Date: Dec. 22, 2020

(87) PCT Pub. No.: WO2020/026408
PCT Pub. Date: Feb. 6, 2020

(65) Prior Publication Data
US 2021/0376674 A1      Dec. 2, 2021

(51) Int. Cl.
*H02K 1/27*      (2022.01)
*H02K 1/2733*    (2022.01)
(Continued)

(52) U.S. Cl.
CPC ......... *H02K 1/2733* (2013.01); *F24F 1/0007* (2013.01); *H02K 21/14* (2013.01);
(Continued)

(58) Field of Classification Search
CPC ...... H02K 1/2733; H02K 21/14; H02K 29/08; H02K 29/03; H02K 2213/03; H02K 5/08;
(Continued)

(56) References Cited

U.S. PATENT DOCUMENTS 10,097,055 B2 * 10/2018 Seufert ..................... F03D 9/25
2015/0028708 A1 * 1/2015 Matsuoka .............. H02K 1/272
310/156.07

FOREIGN PATENT DOCUMENTS

JP    H11-146618 A    5/1999
JP    H11-299207 A   10/1999
(Continued)

OTHER PUBLICATIONS

Japanese Office Action dated Aug. 31, 2021, issued in corresponding Japanese Patent Application No. 2020-533994 (and English machine translation).

(Continued)

*Primary Examiner* — Thomas Truong
(74) *Attorney, Agent, or Firm* — Posz Law Group, PLC (57) ABSTRACT

A motor includes a rotor, a stator, and a magnetic pole position detection element to detect a position of a magnetic pole of the rotor. The rotor includes a resin magnet having a first orientation and a second orientation, and a shaft fixed to the resin magnet, and the first and second orientations and are different from each other in a radial direction. The magnetic pole position detection element faces the resin magnet in an axial direction.

7 Claims, 10 Drawing Sheets

(51) Int. Cl.
  *F24F 1/0007* (2019.01)
  *H02K 21/14* (2006.01)
  *H02K 29/08* (2006.01)
  *H02K 29/03* (2006.01)

(52) U.S. Cl.
  CPC ............. *H02K 29/08* (2013.01); *H02K 29/03* (2013.01); *H02K 2213/03* (2013.01)

(58) Field of Classification Search
  CPC ...... H02K 21/16; F24F 1/0007; F24F 1/0018; F24F 1/38
  See application file for complete search history.

(56) References Cited

FOREIGN PATENT DOCUMENTS

| | | |
|---|---|---|
| JP | 2000-287430 A | 10/2000 |
| JP | 2000-324785 A | 11/2000 |
| JP | 2016-178751 A | 10/2016 |

OTHER PUBLICATIONS

International Search Report of the International Searching Authority dated Nov. 6, 2018 for the corresponding international application No. PCT/JP2018/029015 (and English translation).

\* cited by examiner

MOTOR, FAN, AIR CONDITIONING APPARATUS, AND METHOD FOR MANUFACTURING MOTOR

CROSS REFERENCE TO RELATED APPLICATION

This application is a U.S. national stage application of International Patent Application No. PCT/JP2018/029015 filed on Aug. 2, 2018, the disclosure of which is incorporated herein by reference.

TECHNICAL FIELD

The present invention relates to an electric motor.

BACKGROUND

A proposed resin magnet for use in a rotor of a motor includes a main magnetic pole part and a sensor magnetic pole part for detecting a rotation position of the rotor (see, for example, Patent Reference 1). In the rotor described in Patent Reference 1, the outer diameter of the sensor magnetic pole part is smaller than the inner diameter of the main magnetic pole part, thereby reducing a magnet volume. In this manner, costs for the rotor and the motor can be reduced.

PATENT REFERENCE

Patent Reference 1: Japanese Patent Application Publication No. 2000-324785

In general, in a case where distribution of magnetic flux from a rotor in a rotation direction is a sine wave, torque ripples decrease and thus motor noise can be reduced. The case where the distribution (i.e., a waveform of detected values) of magnetic flux flowing into a position detection element for detecting a rotation position of the rotor is a sine wave, however, has a problem of poor accuracy in detecting the rotation position of the rotor. On the other hand, as in the rotor described in Patent Reference 1, in a case where an orientation (also referred to as a magnetic field orientation) of a sensor magnetic pole part is isotropic, magnetic flux from the rotor does not easily flow into the position detection element and thus there is a problem in that the accuracy of detection of the rotation position of the rotor is poor. It is, therefore, difficult for conventional techniques to achieve both reduction of motor noise and enhancement of the accuracy of detection of the rotation position of the rotor.

SUMMARY

It is an object of the present invention to reduce motor noise as well as to enhance accuracy of detection of a rotation position of a rotor.

A motor according to the present invention includes: a rotor including a resin magnet having a polar anisotropic orientation and a radial orientation and a shaft fixed to the resin magnet; a stator; and a magnetic pole position detection element to detect a position of a magnetic pole of the rotor, and the magnetic pole position detection element faces the resin magnet in an axial direction. The resin magnet includes: a first magnetic flux generating part having the polar anisotropic orientation; and a second magnetic flux generating part having the radial orientation and located between the first magnetic flux generating part and the magnetic pole position detection element, and the motor satisfies $r1 \geq r3 > r2$ where $r1$ is an outer diameter of the first magnetic flux generating part, $r2$ is an outer diameter of the second magnetic flux generating part, and $r3$ is a distance from a rotation center of the rotor to a center of the magnetic pole position detection element.

According to the present invention, motor noise can be reduced, and accuracy of detection of a rotation position of a rotor can be enhanced.

DETAILED DESCRIPTION

First Embodiment

In xyz orthogonal coordinate systems illustrated in the drawings, a z-axis direction (z axis) represents a direction parallel to an axis line Ax of a motor 1, an x-axis direction (x axis) represents a direction orthogonal to the z-axis direction (z axis), and a y-axis direction (y axis) is a direction orthogonal to both the z-axis direction and the x-axis direction. The axis Ax is a rotation center of the rotor 2. The direction parallel to the axis line Ax is also referred to as an "axial direction of the rotor 2" or simply an "axial direction." A radial direction is a direction orthogonal to the axis line Ax.

Figure 1:
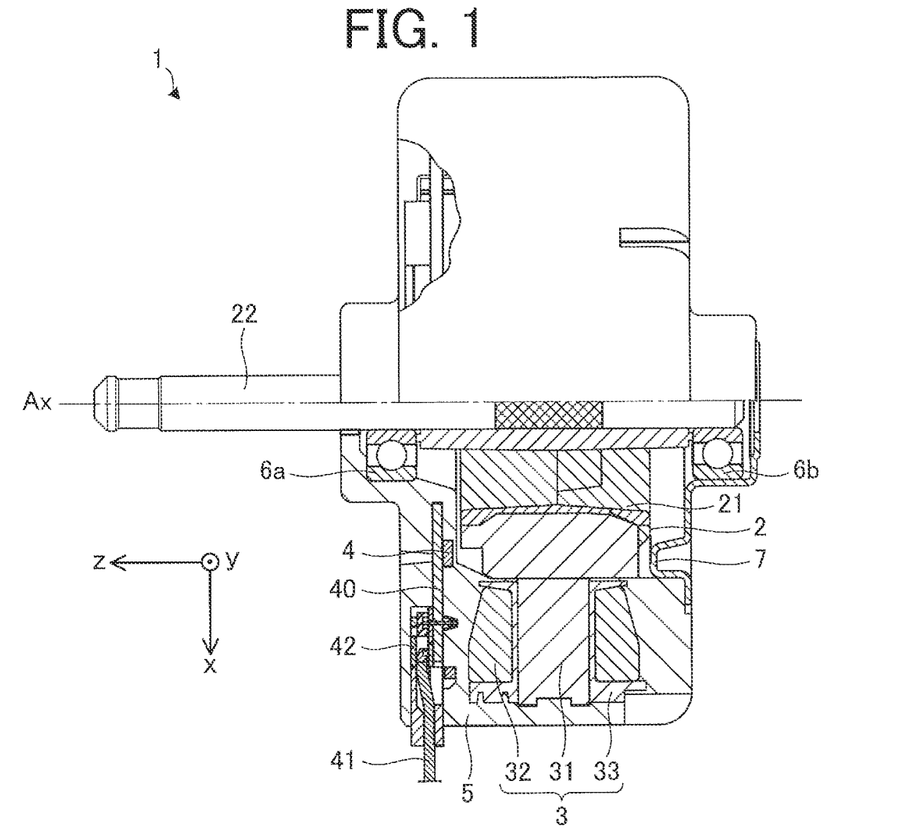
FIG. 1 is a partial cross-sectional view schematically illustrating a structure of a motor according to a first embodiment of the present invention.

FIG. 1 is a partial cross-sectional view schematically illustrating a structure of the motor 1 according to a first embodiment of the present invention.

The motor 1 includes the rotor 2, a stator 3, and a magnetic pole position detection element 4. The motor 1 is also referred to as a molded motor.

In the example illustrated in FIG. 1, the motor 1 also includes a printed wiring board 40, a driving circuit 42, a resin 5, bearings 6a and 6b, and a bracket 7.

The motor 1 is, for example, a permanent magnet motor such as a permanent magnet synchronous motor. It should be noted that the motor 1 is not limited to the permanent magnet motor.

Figure 2:
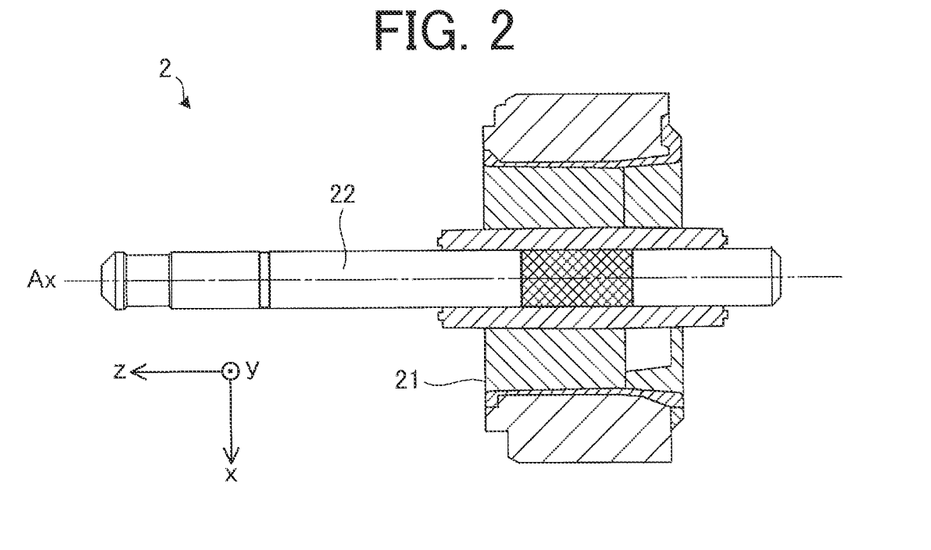
FIG. 2 is a partial cross-sectional view schematically illustrating a structure of a rotor.

FIG. 2 is a partial cross-sectional view schematically illustrating a structure of the rotor 2.

The rotor 2 includes a resin magnet 21 and a shaft 22. The rotor 2 is rotatable about a rotation axis (i.e., the axis line Ax). The rotor 2 is rotatably disposed inside the stator 3 with a gap in between. The shaft 22 is fixed to the resin magnet 21. The bearings 6a and 6b rotatably support both ends of the shaft 22 of the rotor 2.

The resin magnet 21 is formed by mixing magnetic particles such as ferrite and samarium-iron-nitrogen with a thermoplastic resin such as Nylon 12 and Nylon 6.

Figure 3:
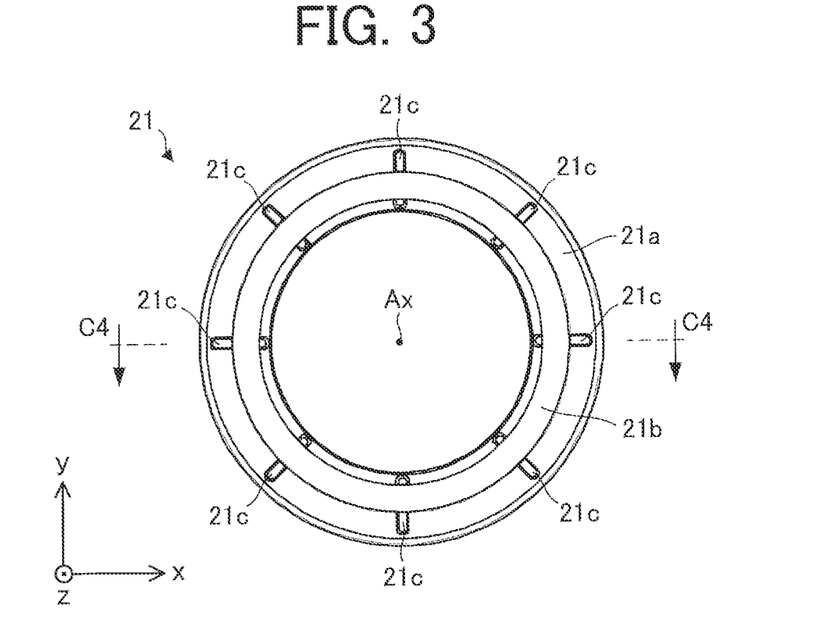
FIG. 3 is a top view schematically illustrating a structure of a resin magnet.

FIG. 3 is a top view schematically illustrating a structure of the resin magnet 21.

Figure 4:
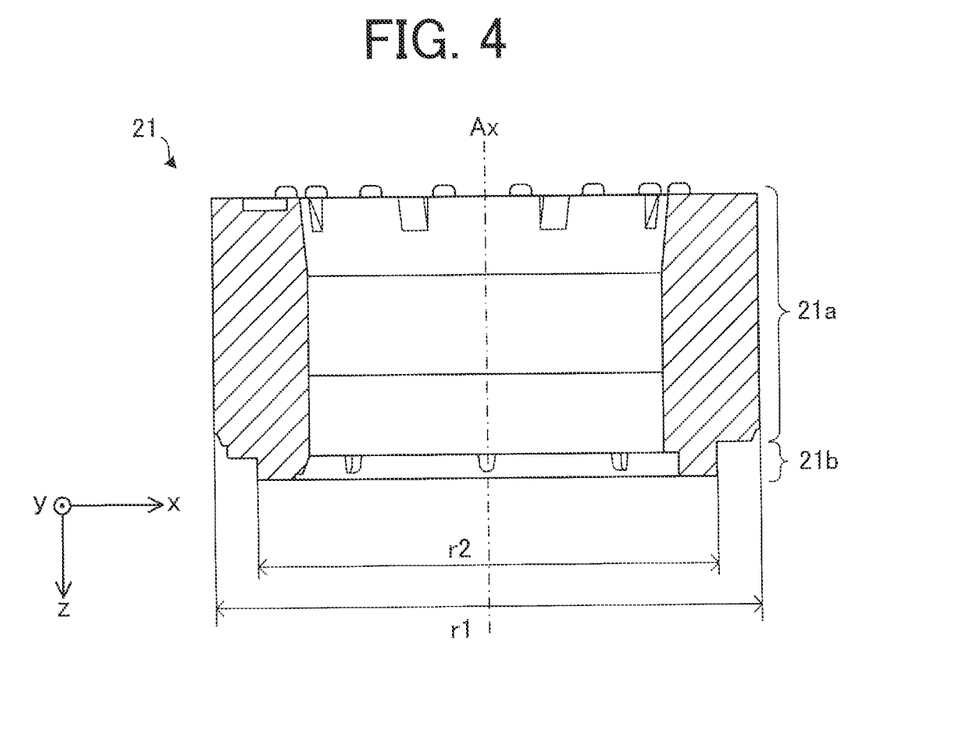
FIG. 4 is a cross-sectional view of the resin magnet taken along a line C4-C4 in FIG. 3.

FIG. 4 is a cross-sectional view of the resin magnet 21 taken along a line C4-C4 in FIG. 3.

Figure 5:
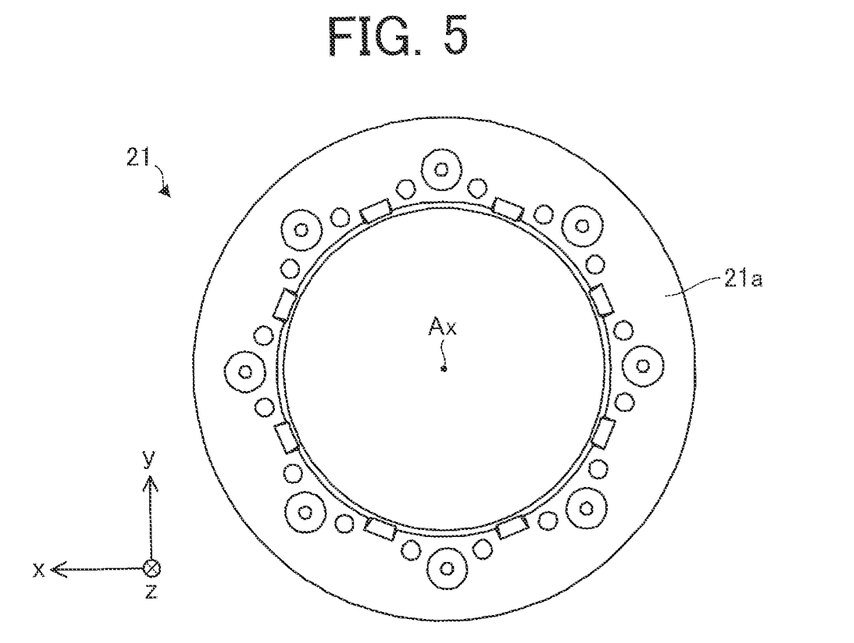
FIG. 5 is a bottom view schematically illustrating a structure of the resin magnet.

FIG. 5 is a bottom view schematically illustrating the structure of the resin magnet 21.

Figure 6:
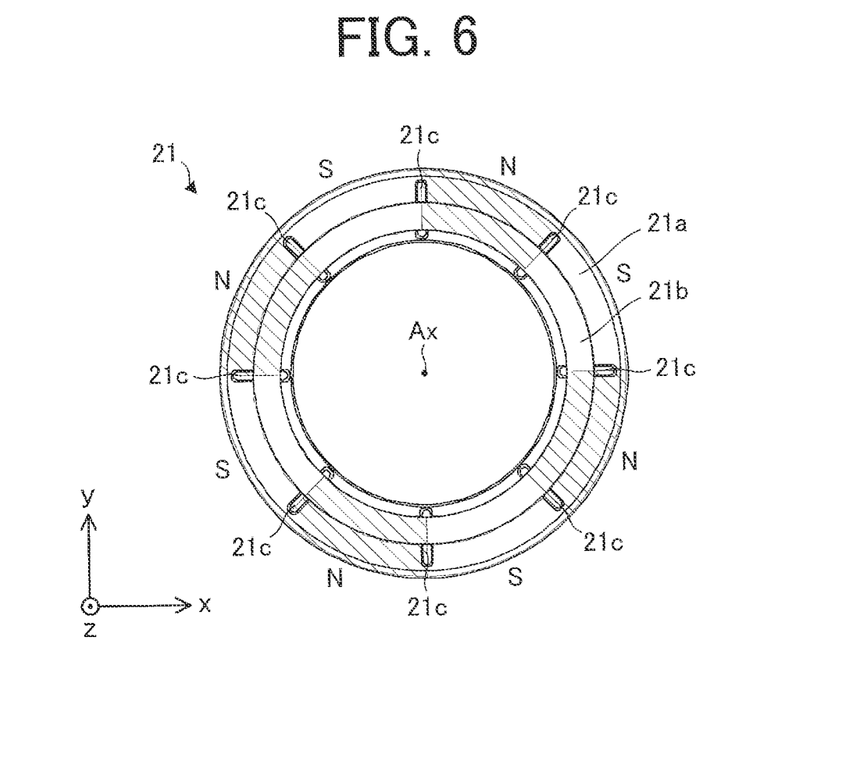
FIG. 6 is a diagram illustrating magnetic poles of the rotor.

FIG. 6 is a diagram illustrating magnetic poles of the rotor 2, specifically the resin magnet 21. In FIG. 6, "N" represents a north pole, and "S" represents a south pole.

The resin magnet 21 has magnetic field orientations of two different types, specifically, a first orientation R1 and a second orientation R2 that are different from each other. More specifically, the resin magnet 21 includes a main magnetic flux generating part 21a serving as a first magnetic flux generating part having the first orientation R1 and a position detection magnetic flux generating part 21b serving as a second magnetic flux generating part having the second orientation R2.

In the examples illustrated in FIGS. 3 through 6, the main magnetic flux generating part 21a has a cylindrical shape, and the position detection magnetic flux generating part 21b also has a cylindrical shape.

The position detection magnetic flux generating part 21b is formed in an end portion of the resin magnet 21 in the axial direction so as to face the magnetic pole position detection element 4. Accordingly, the position detection magnetic flux generating part 21b is located between the main magnetic flux generating part 21a and the magnetic pole position detection element 4.

The inner surface of the main magnetic flux generating part 21a or the position detection magnetic flux generating part 21b may have a projection that is engaged with the shaft 22 (e.g., a groove formed on the surface of the shaft 22). In this manner, displacement of the resin magnet 21 can be avoided.

In the example illustrated in FIG. 6, hatched portions of the resin magnet 21 serve as north poles, and unhatched portions of the resin magnet 21 serve as south poles. In the example illustrated in FIG. 6, the center of a magnetic pole (e.g., the center of a north pole) of the main magnetic flux generating part 21a coincides with the center of a magnetic pole (e.g., the center of a north pole) of the position detection magnetic flux generating part 21b in the circumferential direction. It should be noted that the center of the magnetic pole (e.g., the center of the north pole) of the main magnetic flux generating part 21a may not coincide with the center of the magnetic pole (e.g., the center of the north pole) of the position detection magnetic flux generating part 21b in the circumferential direction.

As illustrated in FIGS. 3 and 6, the resin magnet 21 has at least one projection 21c located on an inter-pole part of the resin magnet 21 and projecting toward the magnetic pole position detection element 4. The inter-pole part is a boundary between a north pole and a south pole. That is, the resin magnet 21 includes a plurality of inter-pole parts, and the projection 21c is disposed between each adjacent ones of the inter-pole parts of the resin magnet 21. In the example illustrated in FIG. 6, the projections 21c are formed on the main magnetic flux generating part 21a.

Accordingly, when the inter-pole part of the resin magnet 21 passes by the magnetic pole position detection element 4, the orientation of magnetic flux flowing into the magnetic pole position detection element 4 can be changed abruptly. That is, it is possible to enhance the accuracy of detection of inter-pole parts (i.e., points of change from the north pole to the south pole or from the south pole to the north pole) detected by the magnetic pole position detection element 4. As a result, the accuracy of detection of the rotation position of the rotor 2 (specifically, the resin magnet 21) can be enhanced.

Figure 7:
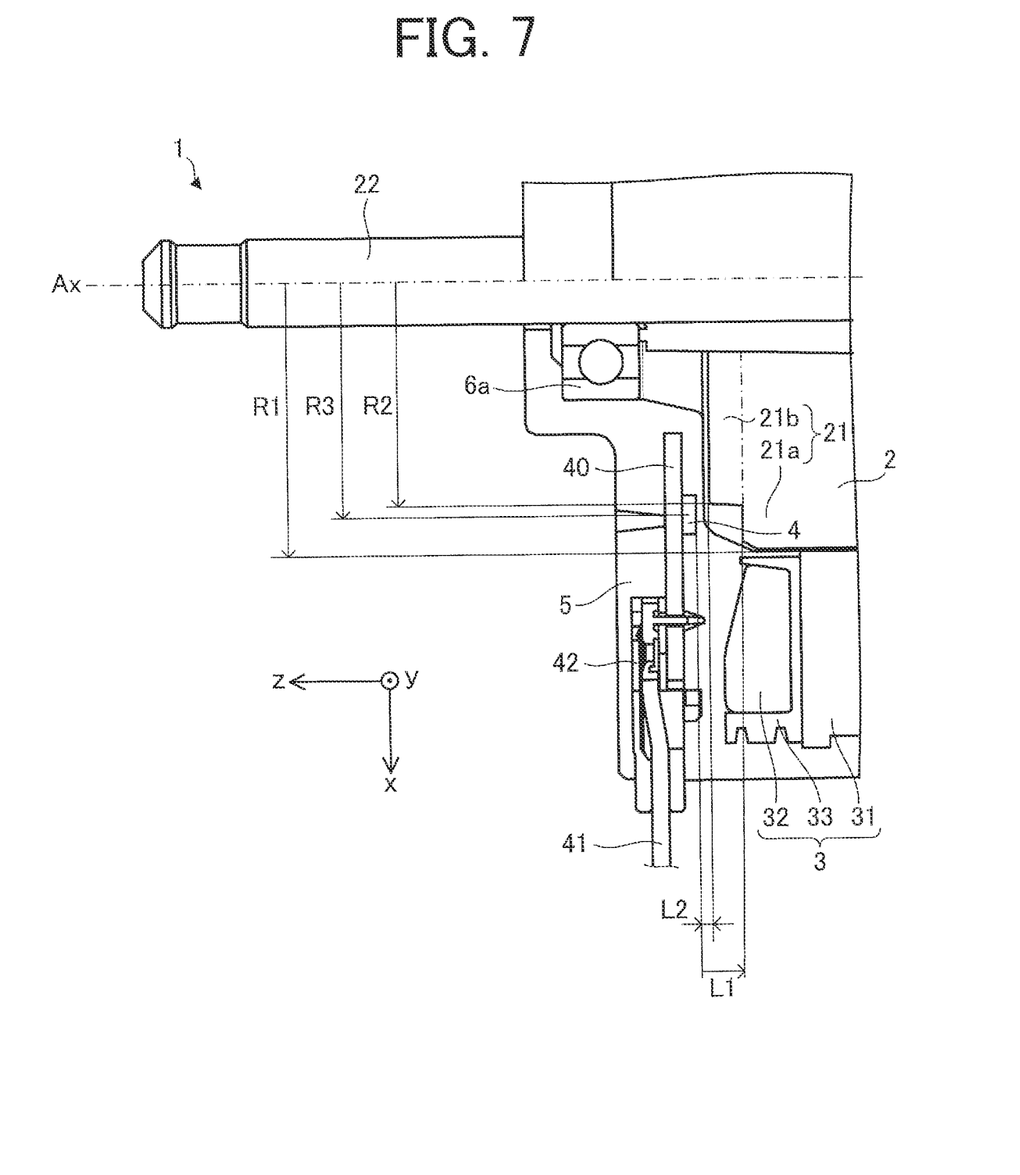
FIG. 7 is a diagram illustrating a positional relationship between the rotor and a stator.

FIG. 7 is a diagram illustrating a positional relationship between the rotor 2 and the stator 3.

Figure 8:
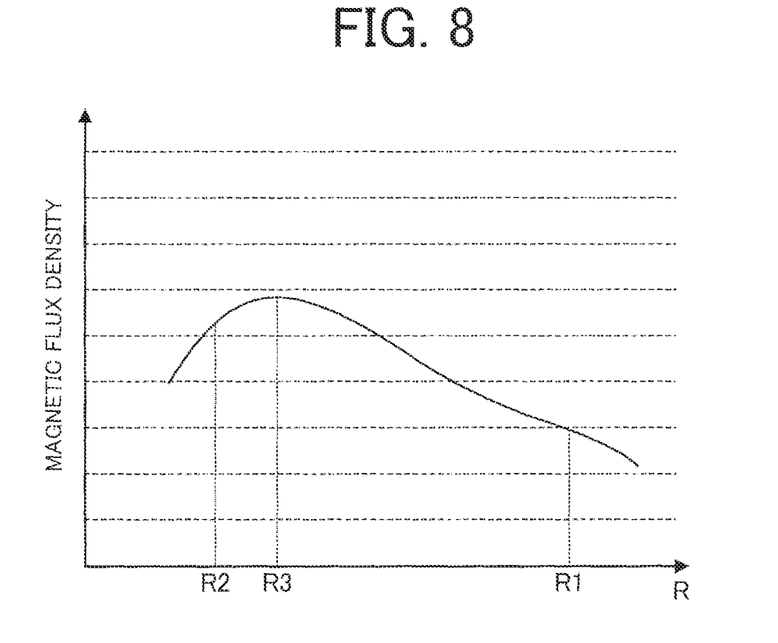
FIG. 8 is a graph showing a relationship between a magnetic flux density from the rotor and a distance from a rotation center of the rotor.

FIG. 8 is a graph showing a relationship between a magnetic flux density from the rotor 2 and a distance R from the rotation center (i.e., the axis line Ax) of the rotor 2. In FIG. 8, the vertical axis represents a magnetic flux density from the rotor 2, and the horizontal axis represents a distance R from the rotation center (i.e., the axis line Ax) of the rotor 2. In FIG. 8, R1 corresponds to a half of the outer diameter of the main magnetic flux generating part 21a, R2 corresponds to a half of the outer diameter of the position detection magnetic flux generating part 21b, and R3 corresponds to a distance from the rotation center of the rotor 2 to the center of the magnetic pole position detection element 4. That is, R1=r1/2, R2=r2/2, and R3=r3.

As illustrated in FIG. 4, supposing the outer diameter of the main magnetic flux generating part 21a is r1 and the outer diameter of the position detection magnetic flux generating part 21b is r2, the relationship between r1 and r2 satisfies r1 r2. Accordingly, in the magnetization process on the main magnetic flux generating part 21a, it is possible to reduce magnetization of the position detection magnetic flux generating part 21b by a permanent magnet Mg1 (see FIG. 12 described later) for magnetizing the permanent magnet main magnetic flux generating part 21a. That is, in the magnetization process on the main magnetic flux generating part 21a, the influence on the orientation (i.e., the second orientation R2) of the position detection magnetic flux generating part 21b can be reduced. As a result, the accuracy of detection of the magnetic flux from the position detection magnetic flux generating part 21b, that is, the accuracy of detection of magnetic pole position of the rotor 2 (specifically, the resin magnet 21) can be enhanced.

In addition, the relationship between r1 and r2 preferably satisfies r1>r2. In this manner, in the magnetization process on the main magnetic flux generating part 21a, the influence on the orientation of the position detection magnetic flux generating part 21b can be further reduced. As a result, the accuracy of detection of the magnetic flux from the position detection magnetic flux generating part 21b can be further enhanced.

Furthermore, supposing a distance from the rotation center of the rotor 2 to the center of the magnetic pole position detection element 4 is r3, a relationship between r1 and r3 satisfies r1≥r3. The center of the magnetic pole position detection element 4 is a center position of the magnetic pole position detection element 4 in the radial direction. Accordingly, it is possible to reduce a flow of magnetic flux from the main magnetic flux generating part 21a or the stator 3 into the magnetic pole position detection element 4. As a result, the accuracy of detection of the magnetic flux from the position detection magnetic flux generating part 21b can be enhanced.

In addition, the relationship between r1 and r3 preferably satisfies r1>r3. In this case, the magnetic pole position detection element 4 is disposed closer to the inside than the outer surface (i.e., the outer peripheral surface) of the main magnetic flux generating part 21a in the radial direction. Accordingly, it is possible to further reduce the flow of magnetic flux from the main magnetic flux generating part 21a or the stator 3 into the magnetic pole position detection element 4. As a result, the accuracy of detection of the magnetic flux from the position detection magnetic flux generating part 21b can be further enhanced.

As illustrated in FIG. 7, a relationship between r2 and r3 satisfies r3≥r2. In this case, as described above, a relationship among r1, r2, and r3 preferably satisfies r1≥r3≥r2. Accordingly, magnetic flux flowing from the position detection magnetic flux generating part 21b into the magnetic pole position detection element 4 can be increased. As a result, the accuracy of detection of the magnetic flux from the position detection magnetic flux generating part 21b can be enhanced.

In addition, the relationship among r1, r2, and r3 preferably satisfies r1≥r3>r2. Accordingly, magnetic flux flowing from the position detection magnetic flux generating part 21b into the magnetic pole position detection element 4 can be further increased. As a result, the accuracy of detection of the magnetic flux from the position detection magnetic flux generating part 21b can be further enhanced.

As described above, the relationship among r1, r2, and r3 preferably satisfies r1>r3≥r2, and most preferably satisfies r1>r3>r2. As a result, the accuracy of detection of the magnetic flux from the position detection magnetic flux generating part 21b can be significantly enhanced.

In addition, as illustrated in FIG. 7, supposing a distance from the magnetic pole position detection element 4 to the main magnetic flux generating part 21a in the axial direction is L1, and a distance from the magnetic pole position detection element 4 to the position detection magnetic flux generating part 21b in the axial direction is L2, a relationship between L1 and L2 satisfies L1≥L2. Accordingly, it is possible to reduce the flow of magnetic flux from the main magnetic flux generating part 21a into the magnetic pole position detection element 4. As a result, the accuracy of detection of the magnetic flux from the position detection magnetic flux generating part 21b can be enhanced.

In addition, the relationship between L1 and L2 preferably satisfies L1>L2. Accordingly, it is possible to further reduce the flow of magnetic flux from the main magnetic flux generating part 21a into the magnetic pole position detection element 4. As a result, the accuracy of detection of the magnetic flux from the position detection magnetic flux generating part 21b can be further enhanced.

Figure 9:
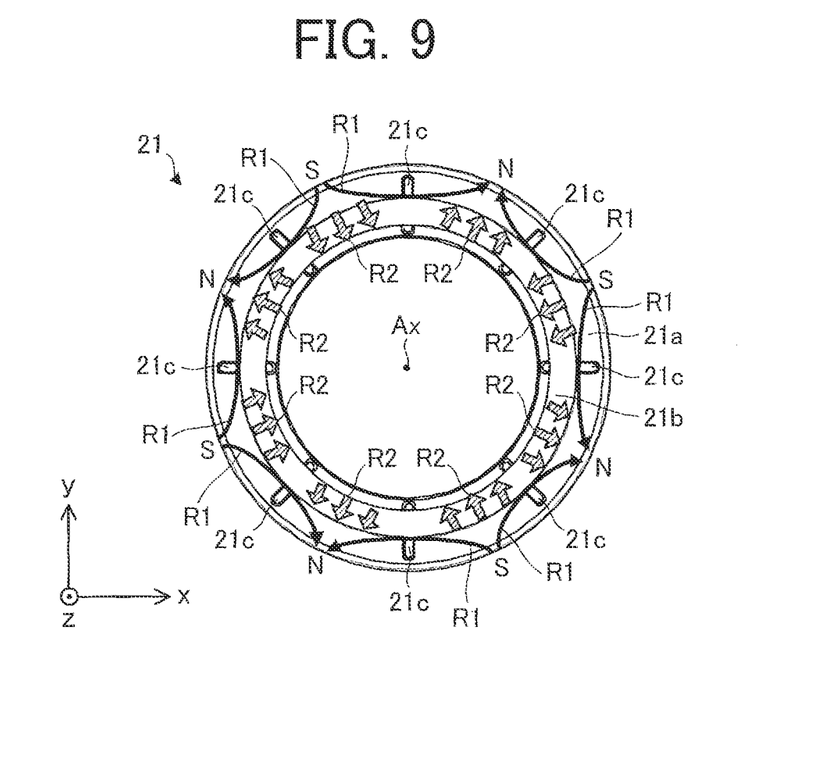
FIG. 9 is a diagram illustrating a first orientation and a second orientation that are magnetic field orientations of the resin magnet.

FIG. 9 is a diagram illustrating the first orientation R1 and the second orientation R2 that are magnetic field orientations of the resin magnet 21. In the example illustrated in FIG. 9, orientations, that is, the first orientation R1 and the second orientation R2, in a plane orthogonal to the axial direction (i.e., an xy plane) are illustrated. In FIG. 9, "N" represents a north pole, and "S" represents a south pole.

Figure 10:
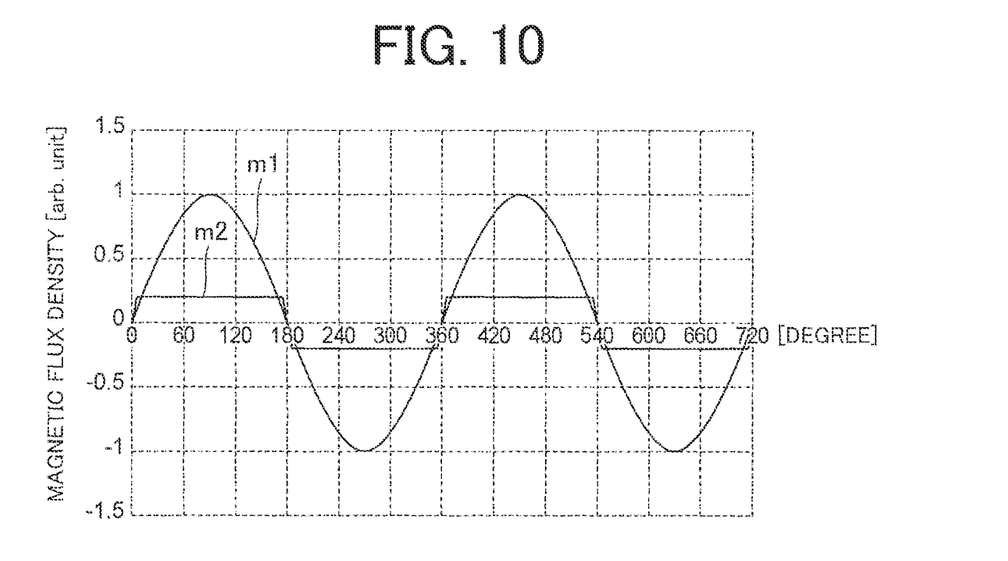
FIG. 10 is a graph showing magnetic flux density distributions from a main magnetic flux generating part and a position detection magnetic flux generating part in a circumferential direction.

FIG. 10 is a graph showing magnetic flux density distributions from the main magnetic flux generating part 21a and the position detection magnetic flux generating part 21b in the circumferential direction. In FIG. 10, the vertical axis represents a magnetic flux density [arbitrary unit], and the horizontal axis represents a rotation angle [degree] of the rotor 2.

The main magnetic flux generating part 21a is magnetized so as to have the first orientation R1. In the example illustrated in FIG. 9, the first orientation R1 is a polar anisotropic orientation. The magnetic flux density distribution of the main magnetic flux generating part 21a in the circumferential direction is represented by a waveform m1 in FIG. 10. That is, the main magnetic flux generating part 21a is magnetized so that detection values of magnetic flux detected by the magnetic pole position detection element 4 form a sine wave. That is, the first orientation R1 is an orientation in which detection values of magnetic flux detected by the magnetic pole position detection element 4 form a sine wave.

The position detection magnetic flux generating part 21b is magnetized so as to have the second orientation R2. The first orientation R1 and the second orientation R2 have orientations that are different from each other in the radial direction. In the example illustrated in FIG. 9, the second orientation R2 is a radial orientation. The magnetic flux density distribution of the position detection magnetic flux generating part 21b in the circumferential direction is represented by a waveform m2 in FIG. 10. That is, the position detection magnetic flux generating part 21b is magnetized so that detection values of magnetic flux detected by the magnetic pole position detection element 4 form a rectangular wave. That is, the second orientation R2 is an orientation in which detection values of magnetic flux detected by the magnetic pole position detection element 4 form a rectangular wave.

The stator 3 includes a stator core 31, a winding 32, and an insulator 33 serving as an insulating part. The stator core 31 is formed of, for example, a plurality of electromagnetic steel sheets. In this case, the plurality of electromagnetic steel sheets are laminated in the axial direction. Each of the plurality of electromagnetic steel sheets is formed in a predetermined shape by punching, and the resulting electromagnetic steel sheets are fixed to each other by caulking, welding, bonding, or the like.

As illustrated in FIG. 1, the motor 1 may include the printed wiring board 40, a lead wire 41 connected to the printed wiring board 40, and the driving circuit 42 fixed to a surface of the printed wiring board 40. In this case, the magnetic pole position detection element 4 is attached to the printed wiring board 40 so as to face the resin magnet 21, specifically, the position detection magnetic flux generating part 21b.

The winding 32 is, for example, a magnet wire. The winding 32 is wound around the insulator 33 combined with the stator core 31 to thereby form a coil. An end portion of the winding 32 is connected to a terminal attached to the printed wiring board 40 by fusing, soldering, or the like.

The insulator 33 is, for example, a thermoplastic resin such as polybutylene terephthalate (PBT). The insulator 33 electrically insulates the stator core 31. The insulator 33 is molded unitedly with the stator core 31, for example. Alternatively, the insulator 33 may be previously molded, and the molded insulator 33 may be combined with the stator core 31.

The driving circuit 42 controls rotation of the rotor 2. The driving circuit 42 is, for example, a power transistor. The driving circuit 42 is electrically connected to the winding 32, and supplies, to the winding 32, a driving current based on a current supplied from the outside or inside (e.g., a battery) of the motor 1. In this manner, the driving circuit 42 controls rotation of the rotor 2.

The magnetic pole position detection element 4 faces the resin magnet 21 in the axial direction. The magnetic pole position detection element 4 detects positions of magnetic poles of the rotor 2. The magnetic pole position detection element 4 detects magnetic flux or a magnetic field from the rotor 2 to thereby detect positions of magnetic poles, i.e., the rotation position, of the rotor 2. The magnetic pole position detection element 4 is, for example, a Hall IC.

The resin 5 is, for example, a thermosetting resin such as a bulk molding compound (BMC). The stator 3 and the printed wiring board 40 are united with the resin 5. The magnetic pole position detection element 4 is attached to the printed wiring board 40. Thus, the magnetic pole position detection element 4 is also united with the stator 3 by using the resin 5. The printed wiring board 40 (including the magnetic pole position detection element 4) and the stator 3 will be referred to as a stator assembly. The printed wiring board 40 (including the magnetic pole position detection element 4), the stator 3, and the resin 5 will be referred to as a mold stator.

An example of a method for manufacturing the motor 1 will be described below.

Figure 11:
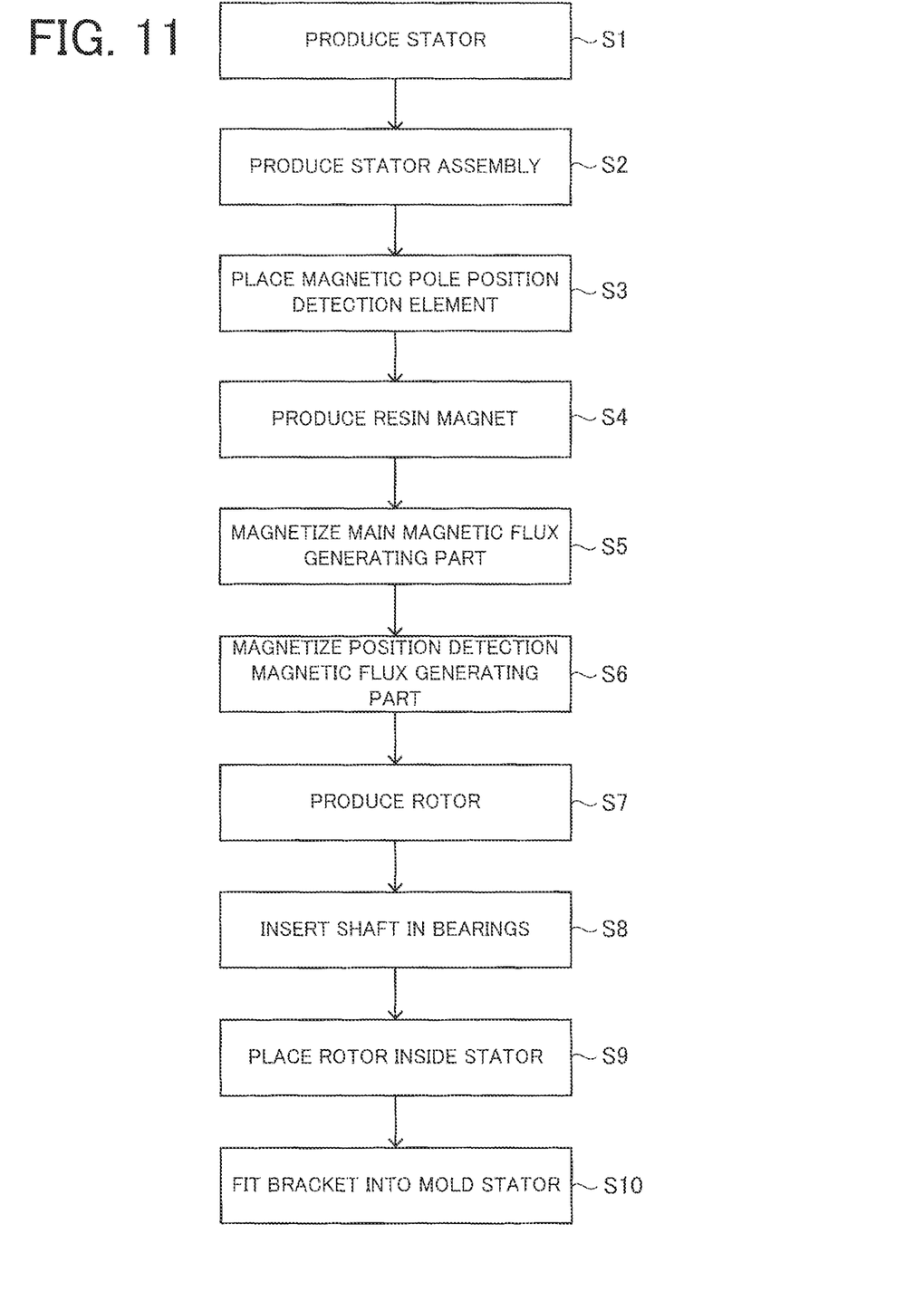
FIG. 11 is a flowchart showing an example of a manufacturing process of a motor.

FIG. 11 is a flowchart showing an example of a manufacturing process of the motor 1. In this embodiment, the method for manufacturing the motor 1 includes steps described below. The method for manufacturing the motor 1, however, is not limited to this embodiment.

In step S1, the stator 3 is produced. For example, the stator core 31 is formed by laminating a plurality of electromagnetic steel sheets in the axial direction. In addition, the previously formed insulator 33 is attached to the stator core 31, and the winding 32 is wound around the stator core 31 and the insulator 33. In this manner, the stator 3 is obtained.

In step S2, a stator assembly is produced. For example, projections of the insulator 33 are inserted in positioning holes of the printed wiring board 40. Accordingly, the printed wiring board 40 is positioned, and a stator assembly is obtained. In this embodiment, the magnetic pole position detection element 4 and the driving circuit 42 are previously fixed to a surface of the printed wiring board 40. The lead wire 41 is also preferably attached to the printed wiring board 40 beforehand. The projections of the insulator 33 projecting from the positioning holes of the printed wiring board 40 may be fixed to the printed wiring board 40 by heat welding, ultrasonic welding, or the like.

In step S3, the magnetic pole position detection element 4 is placed so as to face the resin magnet 21 in the axial direction. Specifically, in step S3, the printed wiring board 40 and the stator 3 are united by using the resin 5. In this case, the printed wiring board 40 is placed at a position where the magnetic pole position detection element 4 on the printed wiring board 40 faces the resin magnet 21, specifically, the position detection magnetic flux generating part 21b. For example, the stator 3 and the printed wiring board 40 are placed in a die, and a material for the resin 5 (e.g., a thermosetting resin such as bulk molding compound) is poured into the die. In this manner, a mold stator is obtained.

In step S4, the resin magnet 21 is produced. Magnetic particles such as ferrite or samarium-iron-nitrogen are mixed with a thermoplastic resin such as Nylon 12 or Nylon 6, and the resin magnet 21 is molded by using a die. In this manner, the resin magnet 21 having the structure described above is produced.

Figure 12:
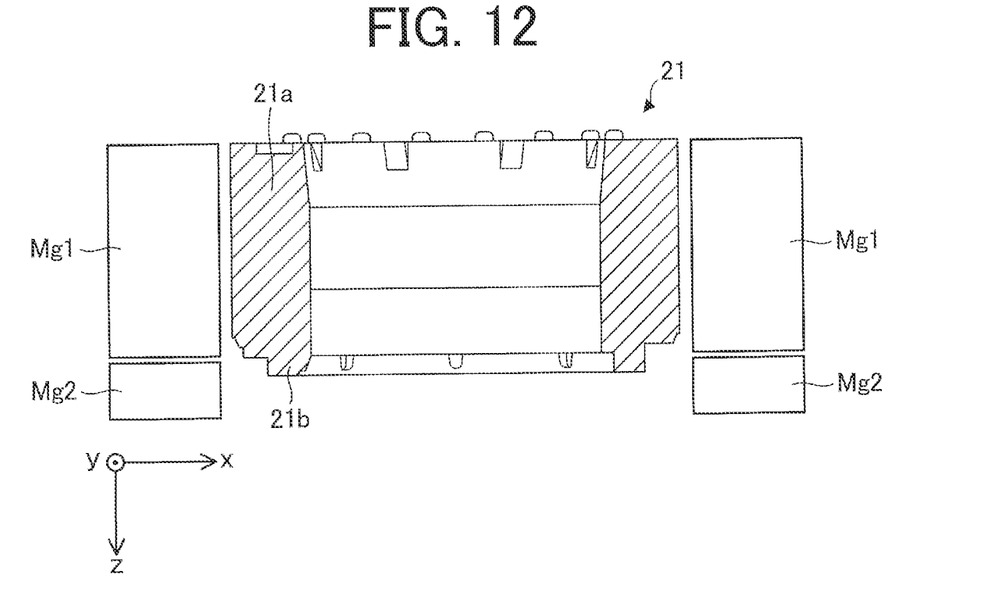
FIG. 12 is a diagram illustrating an example of a magnetization process in steps S5 and S6.

FIG. 12 is a diagram illustrating an example of a magnetization process in steps S5 and S6.

In step S5, the main magnetic flux generating part 21a that is a part of the resin magnet 21 is magnetized so as to have the first orientation R1. Specifically, as illustrated in FIG. 12, the permanent magnet Mg1 for magnetization as a first orientation yoke (also referred to as a first magnetization yoke) is placed so as to face the outer peripheral surface of the main magnetic flux generating part 21a of the resin magnet 21, and the main magnetic flux generating part 21a is magnetized. That is, the main magnetic flux generating part 21a is magnetized so as to have the first orientation R1 by using the permanent magnet Mg1. Instead of the permanent magnet Mg1, a magnetization coil may be used as the first orientation yoke.

In step S6, the position detection magnetic flux generating part 21b that is another part of the resin magnet 21 is magnetized so as to have the second orientation R2 different from the first orientation R1. Specifically, as illustrated in FIG. 12, a permanent magnet Mg2 for magnetization as a second orientation yoke (also referred to as a second magnetization yoke) is placed so as to face the position detection magnetic flux generating part 21b of the resin magnet 21, and the position detection magnetic flux generating part 21b is magnetized. That is, the position detection magnetic flux generating part 21b is magnetized so as to have the second orientation R2 by using the permanent magnet Mg2. Instead of the permanent magnet Mg2, a magnetization coil may be used as the second orientation yoke.

In step S7, the rotor 2 is produced. For example, the shaft 22 is inserted in a shaft hole formed in the resin magnet 21, and the shaft 22 is fixed to the resin magnet 21. The shaft 22 is united with the resin magnet 21 by using, for example, a thermoplastic resin such as polybutylene terephthalate (PBT). In this manner, the rotor 2 is obtained. The resin magnet 21 and the shaft 22 may be made of different materials or may be made of the same material. The resin magnet 21 and the shaft 22 may be integrally formed of the same material.

In step S8, the shaft 22 is inserted in the bearings 6a and 6b.

The order from step S1 to step S8 is not limited to the order indicated in FIG. 11. For example, steps S1 to S3 and steps S4 to S8 may be performed concurrently. Steps S4 to S8 may be performed prior to steps S1 to S3.

In step S9, the rotor 2 is inserted, together with the bearings 6a and 6b, into the stator assembly (specifically, the stator 3). In this manner, the rotor 2 (specifically, the resin magnet 21) is placed inside the stator 3.

In step S10, the bracket 7 is fitted into the mold stator (specifically, the resin 5).

Through the steps described above, the motor 1 is fabricated.

In the motor 1 according to the first embodiment, the rotor 2 has the first orientation R1 and the second orientation R2 that are different from each other in the radial direction, and the magnetic pole position detection element 4 faces the resin magnet 21 in the axial direction. Accordingly, both noise reduction of the motor 1 and enhancement of the accuracy of detection of the rotation position of the rotor 2 can be achieved. Specifically, since the first orientation R1 is an orientation in which detection values of magnetic flux detected by the magnetic pole position detection element 4 form a sine wave, noise of the motor 1 can be reduced. In addition, since the second orientation R2 is an orientation in which detection values of magnetic flux detected by the magnetic pole position detection element 4 form a rectangular wave, the accuracy of detection of the rotation position of the rotor 2 can be enhanced.

In addition, since the magnetic pole position detection element 4 faces the resin magnet 21, specifically, the position detection magnetic flux generating part 21b, in the axial direction, a flow of magnetic flux from the main magnetic flux generating part 21a into the magnetic pole position detection element 4 can be reduced, and the accuracy of detection of the magnetic flux from the position detection magnetic flux generating part 21b can be enhanced. As a result, the accuracy of detection of the rotation position of the rotor 2 can be enhanced.

If the relationship between r1 and r2 satisfies r1≥r2, in the magnetization process on the main magnetic flux generating part 21a, it is possible to reduce magnetization of the position detection magnetic flux generating part 21b by the permanent magnet Mg1 for magnetization on the main magnetic flux generating part 21a. As a result, the accuracy of detection of the magnetic flux from the position detection magnetic flux generating part 21b, that is, the accuracy of detection of magnetic pole position of the rotor 2 (specifically, the resin magnet 21) can be enhanced.

If the relationship between r1 and r3 satisfies r1≥r3, it is possible to reduce the flow of magnetic flux from the main magnetic flux generating part 21a or the stator 3 into the magnetic pole position detection element 4. As a result, the accuracy of detection of the magnetic flux from the position detection magnetic flux generating part 21b can be enhanced.

If the relationship between r2 and r3 satisfies r3≥r2, magnetic flux flowing from the position detection magnetic flux generating part 21b into the magnetic pole position detection element 4 can be increased. As a result, the accuracy of detection of the magnetic flux from the position detection magnetic flux generating part 21b can be enhanced.

If the relationship between L1 and L2 satisfies L1≥L2, it is possible to reduce the flow of magnetic flux from the main magnetic flux generating part 21a into the magnetic pole position detection element 4. As a result, the accuracy of detection of the magnetic flux from the position detection magnetic flux generating part 21b can be enhanced.

The projections 21c are formed on inter-pole parts of the resin magnet 21. Accordingly, when the inter-pole part of the resin magnet 21 passes by the magnetic pole position detection element 4, a change of the orientation of magnetic flux flowing into the magnetic pole position detection element 4 can be made abrupt. That is, it is possible to enhance the accuracy of detection of inter-pole parts (i.e., points of change from the north pole to the south pole or from the south pole to the north pole) detected by the magnetic pole position detection element 4. As a result, the accuracy of detection of the rotation position of the rotor 2 (specifically, the resin magnet 21) can be enhanced.

With the method for manufacturing the motor 1 according to the first embodiment, the step of magnetizing the main magnetic flux generating part 21a having the first orientation R1 and the step of magnetizing the position detection magnetic flux generating part 21b having the second orientation R2 are performed separately, and thus, the first orientation R1 and the second orientation R2 can be clearly distinguished. In this manner, a magnetic force of the resin magnet 21 can be increased, and the accuracy of detection of magnetic pole position of the rotor 2 (specifically, the resin magnet 21) can be enhanced. In addition, it is possible to provide the motor 1 capable of achieving both noise reduction of the motor 1 and enhancement of the accuracy of detection of the rotation position of the rotor 2.

Variation

Figure 13:
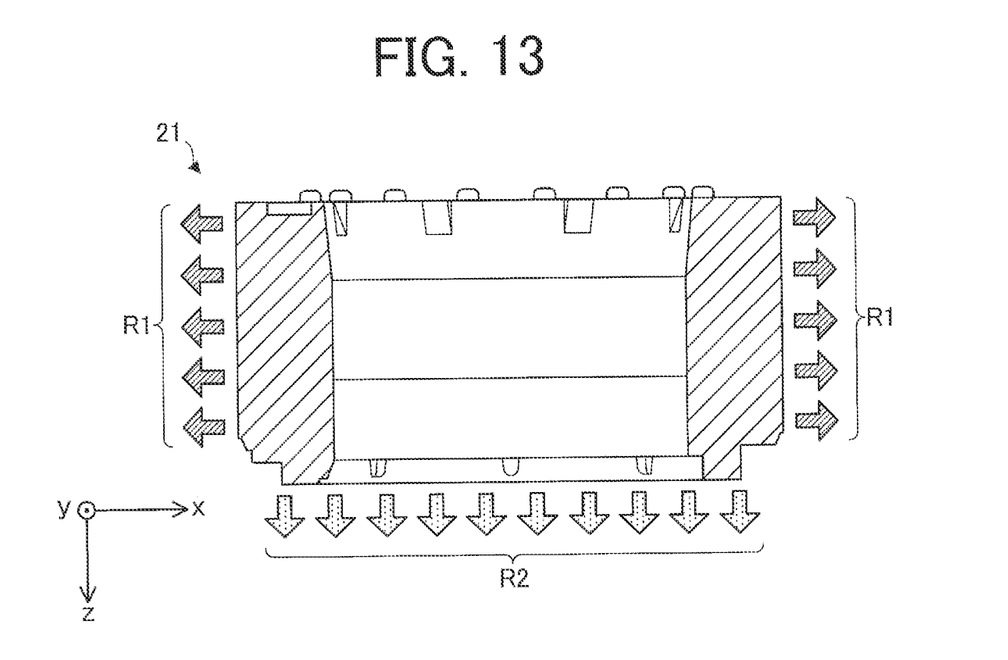
FIG. 13 is a diagram illustrating a first orientation and a second orientation that are magnetic field orientations of a resin magnet 21 in a variation.

FIG. 13 is a diagram illustrating a first orientation R1 and a second orientation R2 that are magnetic field orientations of a resin magnet 21 according to a variation. In the example illustrated in FIG. 13, magnetic field orientations, that is, the first orientation R1 and the second orientation R2, on an xz plane (specifically, a plane along a line C4-C4 illustrated in FIG. 3) are shown. The second orientation R2 is different from the first orientation R1. In the variation, the first orientation R1 is a polar anisotropic orientation, and the second orientation R2 is an axial orientation. That is, in the variation, the second orientation R2 is different from that described in the first embodiment.

The other features of the variation are the same as those of the first embodiment.

In the variation, the same advantages as those described in the first embodiment can also be obtained. In addition, since the magnetic pole position detection element 4 faces the resin magnet 21, specifically, the position detection magnetic flux generating part 21b, in the axial direction, the flow of magnetic flux from the main magnetic flux generating part 21a into the magnetic pole position detection element 4 can be reduced, and the accuracy of detection of the magnetic flux from the position detection magnetic flux generating part 21b can be enhanced. As a result, the accuracy of detection of the rotation position of the rotor 2 can be enhanced.

In addition, in a case where the magnetic pole position detection element 4 faces the position detection magnetic flux generating part 21b in the axial direction, the magnetic pole position detection element 4 can be attached to the printed wiring board 40. In this manner, the size of the motor 1 can be reduced, and costs for the motor 1 can be reduced.

Figure 14:
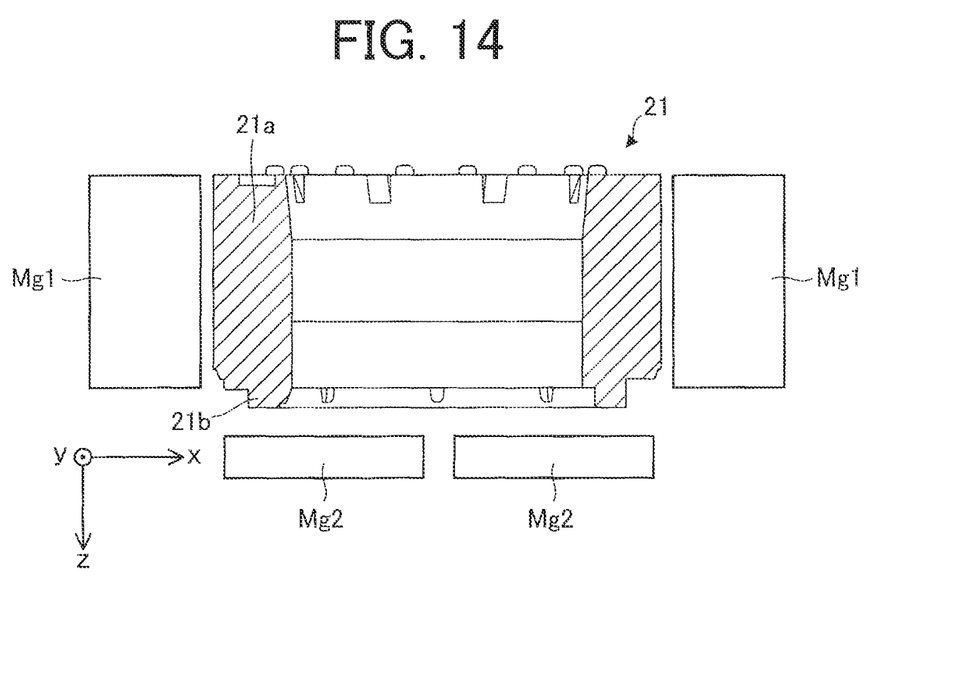
FIG. 14 is a diagram illustrating an example of a magnetization process in a method for manufacturing a motor in the variation.

FIG. 14 is a diagram illustrating an example of a magnetization process in a method for manufacturing the motor 1 in the variation.

As illustrated in FIG. 14, in the magnetization process on the main magnetic flux generating part 21a, the permanent magnet Mg1 for magnetization as the first orientation yoke (also referred to as the first magnetization yoke) is placed so as to face the outer peripheral surface of the main magnetic flux generating part 21a of the resin magnet 21, and the main magnetic flux generating part 21a as a part of the resin magnet 21 is magnetized so as to have the first orientation R1 by using the permanent magnet Mg1.

After the magnetization process on the main magnetic flux generating part 21a, the position detection magnetic flux generating part 21b is magnetized. As illustrated in FIG. 14, in the magnetization process on the position detection magnetic flux generating part 21b, the permanent magnet Mg2 for magnetization as the second orientation yoke (also referred to as the second magnetization yoke) is placed so as to face the position detection magnetic flux generating part 21b in the axial direction, and the position detection magnetic flux generating part 21b as another part of the resin magnet 21 is magnetized so as to have the second orientation R2 by using the permanent magnet Mg2.

In this manner, the main magnetic flux generating part 21a as a part of the resin magnet 21 is magnetized so as to have the first orientation R1, and the position detection magnetic flux generating part 21b as another part of the resin magnet 21 is magnetized so as to have the second orientation R2 different from the first orientation R1.

Steps except for the magnetization process on the main magnetic flux generating part 21a and the magnetization process on the position detection magnetic flux generating part 21b are the same as steps S1 to S4 and steps S7 to S10 shown in FIG. 11.

With the method for manufacturing the motor 1 and the method for manufacturing the rotor 2 according to the variation, the step of magnetizing the main magnetic flux generating part 21a having the first orientation R1 and the step of magnetizing the position detection magnetic flux generating part 21b having the second orientation R2 are performed separately, and thus, the first orientation R1 and the second orientation R2 can be clearly distinguished. Specifically, the permanent magnet Mg2 is placed so as to face the position detection magnetic flux generating part 21b of the resin magnet 21 in the axial direction, and the position detection magnetic flux generating part 21b is magnetized. In this manner, a magnetic flux density flowing in the axial direction can be increased. As a result, a magnetic force of the resin magnet 21 can be increased, and the accuracy of detection of the rotation position of the rotor 2 (specifically, the resin magnet 21) can be enhanced. In this manner, it is possible to provide the rotor 2 capable of reducing noise of the motor 1 as well as enhancing the accuracy of detection of the rotation position of the rotor 2.

Second Embodiment

Figure 15:
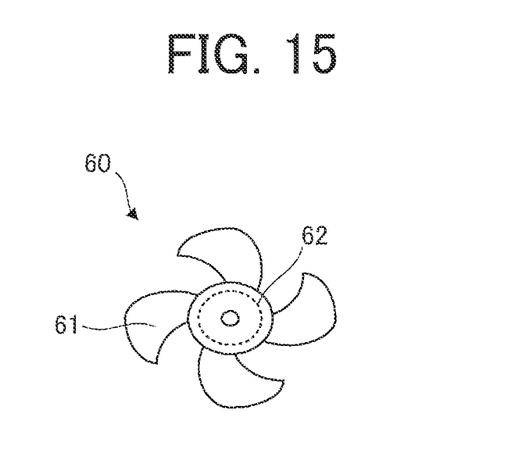
FIG. 15 is a diagram schematically illustrating a structure of a fan according to a second embodiment of the present invention.

FIG. 15 is a diagram schematically illustrating a structure of a fan 60 according to a second embodiment of the present invention.

The fan 60 includes blades 61 and a motor 62. The fan 60 is also referred to as an air blower. The motor 62 is the motor 1 according to the first embodiment. The blades 61 are fixed to a shaft (e.g., the shaft 22 in the first embodiment) of the motor 62. The motor 62 drives the blades 61. When the motor 62 is driven, the blades 61 rotate and thus an airflow is generated. Accordingly, the fan 60 can send air.

With the fan 60 according to the second embodiment, the motor 1 described in the first embodiment is applied to the motor 62, and thus, the same advantages as those described in the first embodiment can be obtained. As a result, noise of the fan 60 can be reduced, and control of the fan 60 can be improved.

Third Embodiment

An air conditioning apparatus 50 according to a third embodiment of the present invention will be described.

Figure 16:
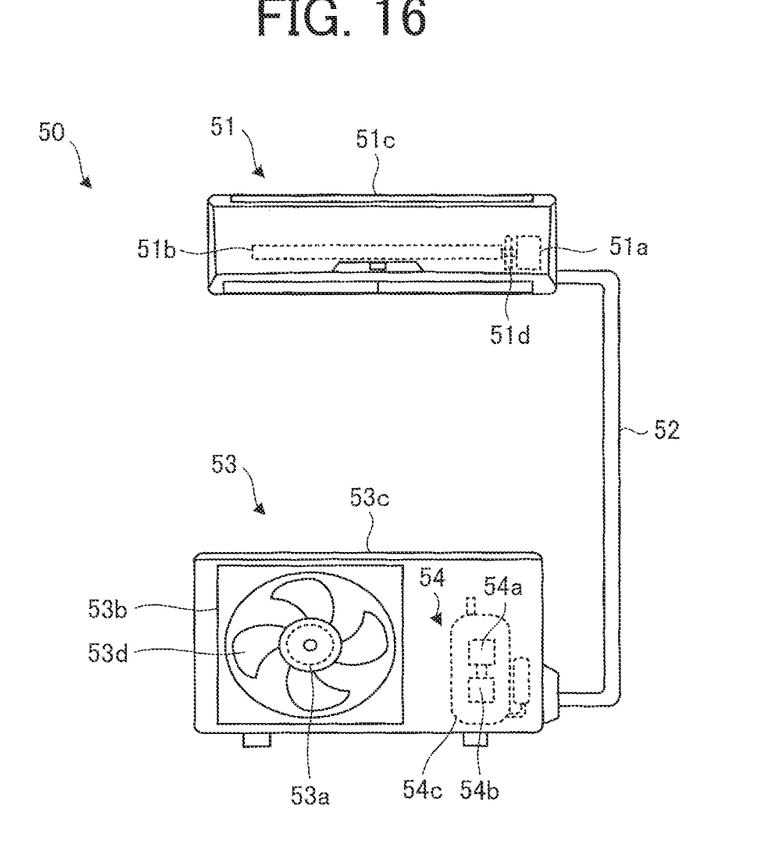
FIG. 16 is a diagram schematically illustrating a configuration of an air conditioning apparatus according to a third embodiment of the present invention.

FIG. 16 is a diagram schematically illustrating a configuration of the air conditioning apparatus 50 according to the third embodiment of the present invention.

The air conditioning apparatus 50 (e.g., a refrigeration air conditioning apparatus) according to the third embodiment includes an indoor unit 51 serving as an air blower (first air blower), a refrigerant pipe 52, and an outdoor unit 53 serving as an air blower (second air blower) connected to the indoor unit 51 by the refrigerant pipe 52.

The indoor unit 51 includes a motor 51a (e.g., the motor 1 according to the first embodiment), an air supply unit 51b that is driven by the motor 51a to thereby send air, and a housing 51c covering the motor 51a and the air supply unit 51b. The air supply unit 51b includes blades 51d that are driven by the motor 51a, for example. For example, the blades 51d are fixed to a shaft (e.g., the shaft 22 in the first embodiment) of the motor 51a, and generate an airflow.

The outdoor unit 53 includes a motor 53a (e.g., the motor 1 according to the first embodiment), an air supply unit 53b, a compressor 54, and a heat exchanger (not shown). The air supply unit 53b is driven by the motor 53a to thereby send air. The air supply unit 53b includes blades 53d that are driven by the motor 53a, for example. For example, the blades 53d are fixed to a shaft (e.g., the shaft 22 in the first embodiment) of the motor 53a, and generate an airflow. The compressor 54 includes a motor 54a (e.g., the motor 1 according to the first embodiment), a compression mechanism 54b (e.g., a refrigerant circuit) that is driven by the motor 54a, and a housing 54c covering the motor 54a and the compression mechanism 54b.

In the air conditioning apparatus 50, at least one of the indoor unit 51 or the outdoor unit 53 includes the motor 1 described in the first embodiment. Specifically, as a driving source of the air supply unit, the motor 1 described in the first embodiment is applied to at least one of the motors 51a or 53a. In addition, as the motor 54a of the compressor 54, the motor 1 described in the first embodiment may be used.

The air conditioning apparatus 50 can perform operations such as a cooling operation of sending cold air and a heating operation of sending warm air from the indoor unit 51. In the indoor unit 51, the motor 51a is a driving source for driving the air supply unit 51b. The air supply unit 51b is capable of sending conditioned air.

In the air conditioning apparatus 50 according to the third embodiment, the motor 1 described in the first embodiment is applied to at least one of the motors 51a or 53a, and thus, the same advantages as those described in the first embodiment can be obtained. Accordingly, noise of the air conditioning apparatus 50 can be reduced, and control of the air conditioning apparatus 50 can be improved.

In addition, the use of the motor 1 according to the first embodiment as a driving source of the air blower (e.g., the indoor unit 51) can obtain the same advantages as those described in the first embodiment. Accordingly, noise of the air blower can be reduced, and control of the air blower can be improved. The air blower including the motor 1 according to the first embodiment and blades (e.g., the blades 51d or 53d) driven by the motor 1 can be used alone as a device for sending air. This air blower is also applicable to equipment other than the air conditioning apparatus 50.

In addition, the use of the motor 1 according to the first embodiment as a driving source of the compressor 54 can obtain the same advantages as those described in the first embodiment. Accordingly, noise of the compressor 54 can be reduced, and control of the compressor 54 can be improved.

The motor 1 described in the first embodiment can be mounted on equipment including a driving source, such as a ventilator, a household electrical appliance, or a machine tool, in addition to the air conditioning apparatus 50.

Features of the embodiments described above can be combined as appropriate.

What is claimed is:
1. A motor comprising:
a rotor including a resin magnet having a polar anisotropic orientation and a radial orientation and a shaft fixed to the resin magnet;
a stator; and a magnetic pole position detection element to detect a position of a magnetic pole of the rotor, wherein the magnetic pole position detection element faces the resin magnet in an axial direction, wherein the resin magnet includes:

a first magnetic flux generating part having the polar anisotropic orientation; and a second magnetic flux generating part having the radial orientation and located between the first magnetic flux generating part and the magnetic pole position detection element, and the motor satisfies r1≥r3>r2 where r1 is an outer diameter of the first magnetic flux generating part, r2 is an outer diameter of the second magnetic flux generating part, and r3 is a distance from a rotation center of the rotor to a center of the magnetic pole position detection element.

2. The motor according to claim 1, wherein the resin magnet includes:

a first magnetic flux generating part having the polar anisotropic orientation; and a second magnetic flux generating part having the radial orientation and located between the first magnetic flux generating part and the magnetic pole position detection element, and the motor satisfies L1>L2 where L1 is a distance from the magnetic pole position detection element to the first magnetic flux generating part in the axial direction and L2 is a distance from the magnetic pole position detection element to the second magnetic flux generating part in the axial direction.

3. The motor according to claim 1, wherein the resin magnet includes:

a first magnetic flux generating part having the polar anisotropic orientation; and a second magnetic flux generating part having the radial orientation and located between the first magnetic flux generating part and the magnetic pole position detection element, the first magnetic flux generating part is magnetized so that detection values of magnetic flux detected by the magnetic pole position detection element form a sine wave, and the second magnetic flux generating part is magnetized so that detection values of magnetic flux detected by the magnetic pole position detection element form a rectangular wave.

4. The motor according to claim 1, wherein the resin magnet has a projection located on an inter-pole part of the resin magnet, the projection projecting toward the magnetic pole position detection element.

5. A fan comprising:

a blade; and the motor to drive the blade, according to claim 1.

6. An air conditioning apparatus comprising:

an indoor unit; and an outdoor unit connected to the indoor unit, wherein at least one of the indoor unit or the outdoor unit includes the motor according to claim 1.

7. A method for manufacturing a motor, the motor including a rotor including a resin magnet, a stator, and a magnetic pole position detection element to detect a position of the rotor, the method comprising:

producing the resin magnet;

magnetizing a part of the resin magnet so as to have a polar anisotropic orientation;

magnetizing another part of the resin magnet so as to have a radial orientation;

producing the rotor by fixing a shaft to the resin magnet;

placing the rotor inside the stator; and placing the magnetic pole position detection element so as to face the resin magnet in an axial direction, wherein the resin magnet includes:

a first magnetic flux generating part having the polar anisotropic orientation; and a second magnetic flux generating part having the radial orientation and located between the first magnetic flux generating part and the magnetic pole position detection element, and the motor satisfies r1≥r3>r2 where r1 is an outer diameter of the first magnetic flux generating part, r2 is an outer diameter of the second magnetic flux generating part, and r3 is a distance from a rotation center of the rotor to a center of the magnetic pole position detection element.

* * * * *